United States Patent
Cote et al.

(10) Patent No.: US 8,661,935 B2
(45) Date of Patent: Mar. 4, 2014

(54) ADJUSTABLE HANDLEBAR STEM FOR A BICYCLE

(75) Inventors: Mark Cote, Aptos, CA (US); Aaron J. Foley, San Jose, CA (US); Christopher P. D'Aluisio, Corralitos, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 87 days.

(21) Appl. No.: 13/113,735

(22) Filed: May 23, 2011

(65) Prior Publication Data

US 2012/0297922 A1 Nov. 29, 2012

(51) Int. Cl.
*B62K 21/16* (2006.01)

(52) U.S. Cl.
USPC ........................................................ 74/551.3

(58) Field of Classification Search
USPC .................................. 74/551.1, 551.3, 551.4
See application file for complete search history.

(56) References Cited

U.S. PATENT DOCUMENTS

| | | | |
|---|---|---|---|
| 3,385,615 A | 5/1968 | Hussey | |
| 5,138,900 A | 8/1992 | Hals | |
| 5,273,302 A | 12/1993 | Ureel | |
| 5,323,664 A | 6/1994 | Fairfield et al. | |
| 5,404,769 A * | 4/1995 | Kao | 74/551.3 |
| 5,570,614 A | 11/1996 | Nastrucci | |
| 5,755,141 A | 5/1998 | Chen | |
| 5,842,385 A | 12/1998 | Su | |
| 6,234,042 B1 * | 5/2001 | An | 74/551.5 |
| 6,343,891 B1 | 2/2002 | Combs | |
| 6,609,437 B2 | 8/2003 | Jiang | |
| 6,920,806 B2 | 7/2005 | Cutsforth | |
| 6,928,897 B2 | 8/2005 | Duncan | |
| 7,837,212 B2 | 11/2010 | D'Aluisio | |
| 2002/0157499 A1 * | 10/2002 | Liao | 74/551.1 |
| 2005/0109150 A1 * | 5/2005 | Chiang et al. | 74/551.1 |
| 2005/0132839 A1 * | 6/2005 | Chen | 74/551.8 |
| 2006/0099027 A1 * | 5/2006 | Liao | 403/322.4 |
| 2006/0230872 A1 | 10/2006 | Huang | |
| 2010/0275723 A1 * | 11/2010 | Servet | 74/551.1 |
| 2011/0107872 A1 | 5/2011 | Servet | |

* cited by examiner

*Primary Examiner* — Vicky Johnson
(74) *Attorney, Agent, or Firm* — Michael Best & Friedrich LLP (57) ABSTRACT

A bicycle including a frame that has a head tube. The bicycle also includes a fork that is rotationally coupled to the head tube and that has a steerer tube extending upward through the head tube, a wheel rotationally coupled to the fork, a handlebar, and a stem assembly. The stem assembly is coupled to and extends from the steerer tube to attach the handlebar to the fork. The stem assembly includes a stem, a shim that is coupled to the stem, and a clamp contacting both the shim and the handlebar to secure the handlebar to the stem assembly.

20 Claims, 6 Drawing Sheets

Figure 5:
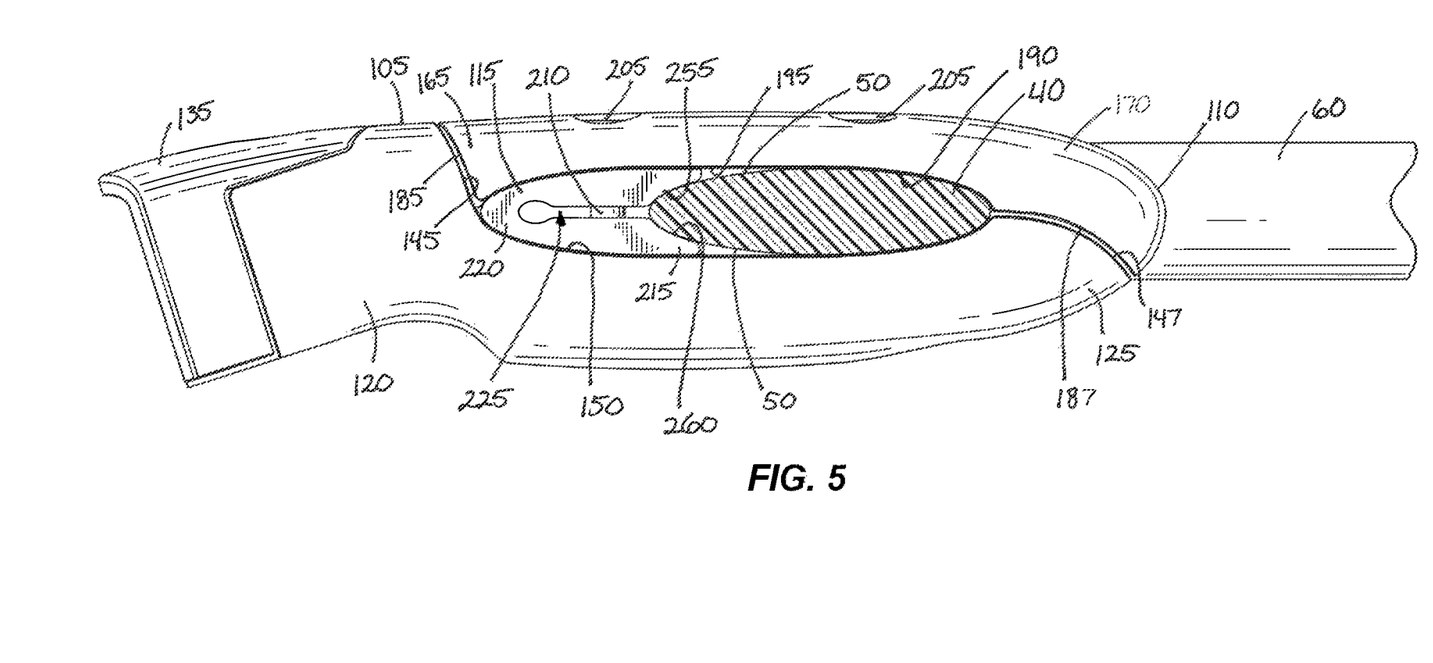
FIG. 5 is a cross-section of the front portion of the bicycle taken along line 5-5 in FIG. 4 and illustrating the handlebar in a first position.
Figure 6:
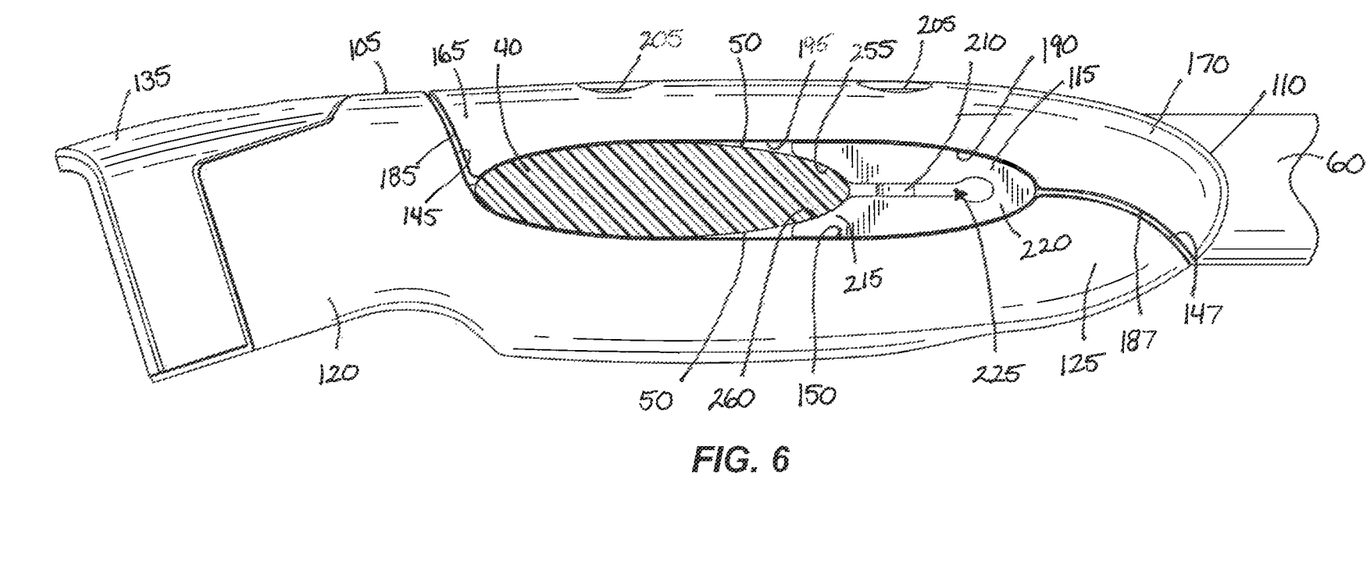

FIG. 6 is the cross-section of FIG. 5 illustrating the handlebar in a second position.

ADJUSTABLE HANDLEBAR STEM FOR A BICYCLE

BACKGROUND

The present invention relates generally to bicycles, and more specifically to systems for mounting handlebars.

Bicycles commonly have a main frame and a front fork pivotally secured to the main frame. The main frame typically includes a rear wheel mount (commonly called a rear dropout) for receiving a rear wheel axle, and the front fork typically includes a front wheel mount (commonly called a front dropout) for receiving a front wheel axle. Steering control of the bicycle is provided by a handlebar that is usually secured to the front fork via a handlebar stem.

SUMMARY

In one construction, the present invention provides a bicycle including a frame that has a head tube, a fork that is rotationally coupled to the head tube and that has a steerer tube extending upward through the head tube, and a wheel rotationally coupled to the fork. The bicycle also includes a handlebar and a stem assembly that is coupled to and extends from the steerer tube to couple the handlebar to the fork. The stem assembly includes a stem, a shim that is coupled to the stem, and a clamp contacting both the shim and the handlebar to secure the handlebar to the stem assembly.

In another construction, the present invention provides a stem assembly for attaching a handlebar to a bicycle frame. The stem assembly includes a stem, a shim coupled to the stem, and a clamp attached to the stem. The clamp is in direct contact with the shim and is directly contactable with the handlebar to hold the handlebar in one of a first position and a second position different from the first position.

In another construction, the present invention provides a bicycle including a frame that has a head tube, a fork that is rotationally coupled to the head tube and that has a steerer tube extending upward through the head tube, and a wheel rotationally coupled to the fork. The bicycle also includes a handlebar and a stem assembly that is coupled to and extends from the steerer tube to attach the handlebar to the fork. The stem assembly includes a stem, a shim that is coupled to the stem, and a clamp that is attached to the stem to hold the handlebar in one of a first position and a second position different from the first position. The handlebar abuts the stem, the clamp, and the shim in the first position.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
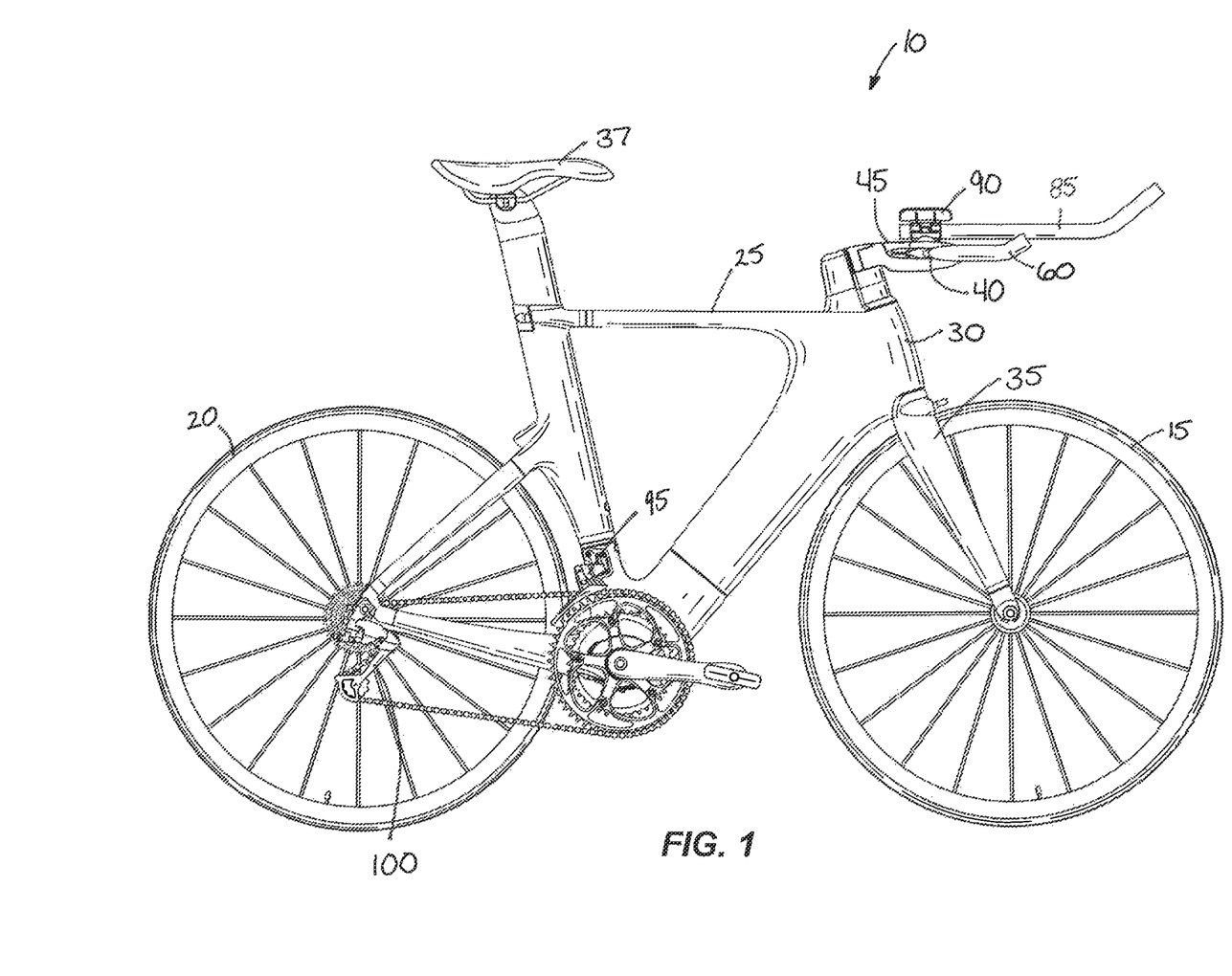
FIG. 1 is a side view of a bicycle embodying the present invention.

FIG. 1 shows a bicycle 10 that includes a front wheel 15, a rear wheel 20, and a frame 25. The frame 25 has a head tube 30, a front fork 35 rotationally supported by the head tube 30 and that secures the front wheel 15 to the frame 25, and a seat 37 supported by the frame 25.

Figure 2:
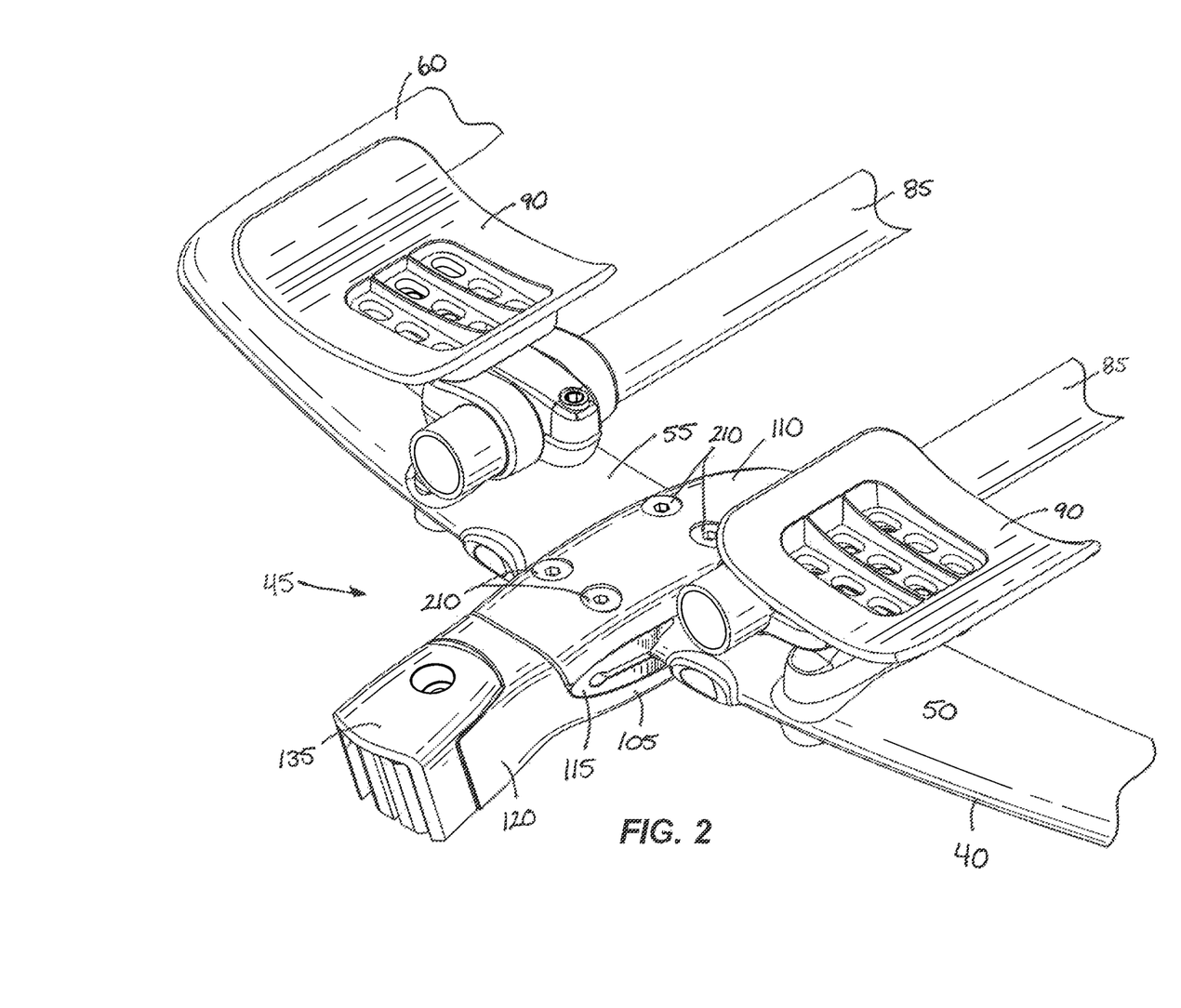
FIG. 2 is a rear perspective view of a front portion of the bicycle illustrated in FIG. 1, including a handlebar and stem assembly.
Figure 3:
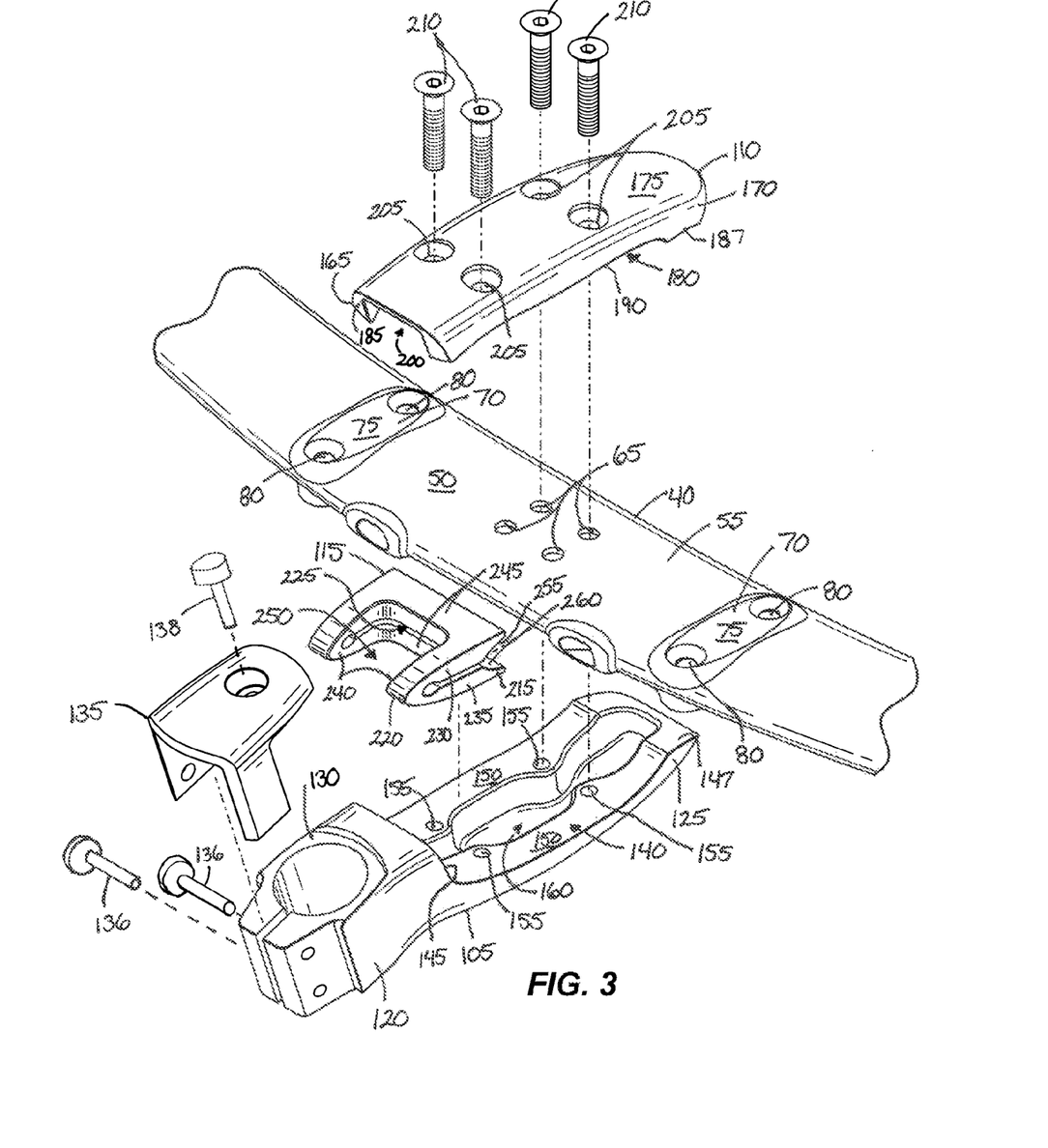
FIG. 3. is an exploded perspective view of the front portion of the bicycle in FIG. 2.

With reference to FIGS. 1-3, the bicycle 10 also includes a handlebar 40 and a stem assembly 45 that secures the handlebar 40 to the front fork 35 such that movement of the handlebar 40 results in movement of the stem assembly 45 and the fork 35. The handlebar 40 has an elliptical profile defined by curved outer surfaces 50, and includes a base bar that has an aerodynamic portion 55 and bar ends 60 extending from and contiguous with the ends of the aerodynamic portion 55. The middle portion of the aerodynamic portion 55 extends through and is secured to the stem assembly 45 to inhibit relative movement between the handlebar 40 and the stem assembly 45. With reference to FIGS. 2-6, the middle portion of the aerodynamic portion 55 has four holes 65 spaced a small distance from each other, and extension plates 70 formed in the handlebar 40 laterally outward from the holes 65. The illustrated holes 65 are arranged in a rectangular grouping, although other quantities of the holes 65 and other-shaped groupings are possible. Each of the extension plates 70 defines a relatively planar mounting surface 75 on the handlebar 40 and includes threaded holes 80.

With continued reference to FIG. 2, the handlebar 40 also includes handlebar extensions 85 that are coupled to the aerodynamic portion 55 at the extension plates 70 using fasteners (not shown) extending into the threaded holes 80. The handlebar extensions 85 extend forward from the aerodynamic portion 55 on opposite sides of the stem assembly 45. Arm pads 90 are mounted on top of each extension 85, and gear shift levers (not shown) can be mounted on the front end of each extension 85, as is known in the art. Cables (not shown) connecting the gear shift levers with respective front and rear derailleurs 95, 100 (FIG. 1) can be routed to the frame 25 by any suitable means, as is known in the art.

FIGS. 2 and 3 show that the stem assembly 45 includes a stem 105, a faceplate or clamp 110, and a spacer or shim 115. The stem 105 is defined by an elongated body that has a first end 120 and a second end 125 opposite the first end 120. The first end 120 includes a steerer tube portion 130 that receives the steerer tube. The stem 105 is fixed to the steerer tube by a steerer tube attachment 135 and fasteners 136 that extend laterally through the steerer tube attachment 135 and the first end 120 of the stem 105 to clamp or secure the steerer tube to the stem 105. Another fastener 138 extends vertically (downward) through the steerer tube attachment 135 into the steerer tube to facilitate axial adjustment of the stem 105 relative to the steerer tube.

With reference to FIG. 3, the stem 105 includes a first recessed portion or first cavity 140 located between the first end 120 and the second end 125, a first mating surface 145 at the first end 120, and a second mating surface 147 at the second end 125. The first cavity 140 has a curvilinear surface 150, and first fastener holes 155 extend into the stem 105 from the curvilinear surface 150. As illustrated, the first fastener holes 155 are threaded and are located on both sides of a passageway 160 extending longitudinally through the stem 105. The passageway 160 is defined by narrow passageway areas located adjacent laterally-spaced pairs of the first fastener holes 155 to accommodate spacing between the first fastener holes 155, and a wide passageway area connecting the narrow passageway areas. The passageway 160 is formed in the stem 105 so that the stem 105 can be lightweight while still having adequate stiffness and rigidity.

FIGS. 2-6 show that the clamp 110 is coupled to the stem 105 to secure the handlebar 40 in a desired position. The clamp 110 is defined by an elongated body that has a first end 165 and a second end 170, and a curved exterior surface 175 extending between the first and second ends 165, 170. The clamp 110 includes a second recessed portion or second cavity 180 located between the first end 165 and the second end 170, a first mating surface 185 and a second mating surface 187 at the second end 170. The second cavity 180 has a curvilinear surface 190 that cooperates with the curvilinear surface 150 of the first cavity 140 to define an opening 195 (FIGS. 5 and 6) in which the handlebar 40 is positioned. A passageway 200 is formed longitudinally in the clamp 110 so that the clamp 110 can be lightweight while still having adequate stiffness and rigidity.

With reference to FIG. 3, second fastener holes 205 extend through the clamp 110 and are spaced apart from each other so that each second fastener hole 205 is aligned with a corresponding first fastener hole 155 when the stem assembly 45 is assembled. The clamp 110 is nested on and coupled to the stem 105 by stem fasteners 210 that extend through the second fastener holes 205, through two of the holes 65 in the handlebar 40, and into the first fastener holes 155 to rigidly secure the handlebar 40 to the stem assembly 45.

FIGS. 3-6 show that the saddle-shaped shim 115 has a curvilinear side profile matching the curvilinear profile of the opening 195 defined by the stem 105 and the clamp 110. The shim 115 is defined by a first or clamp end 215 and a second or distal end 220 opposite the clamp end 215. As shown in FIGS. 3, 5, and 6, the shim 115 includes a channel 225 that extends from the clamp end 215 toward the distal end 220. The channel 225 divides the shim 115 into a first shim portion 230 and a second shim portion 235 (upper portion and lower portion, respectively, as viewed in FIGS. 5 and 6) that are symmetrical about a plane defined by the channel 225. The first and second shim portions 230, 235 flex relative to each other at the distal end 220, and the shim portions 230, 235 are connected to each other at the distal end 220 to form opposed end portions 240 of the shim 115. The end portions 240 are connected by bridges 245 adjacent the clamp end 215. A void 250 is defined between the end portions 240 such that the bridges 245 and the end portions 240 cooperatively define a "U"-shape profile (e.g., when viewed from above in FIG. 3) of the shim 115.

Figure 4:
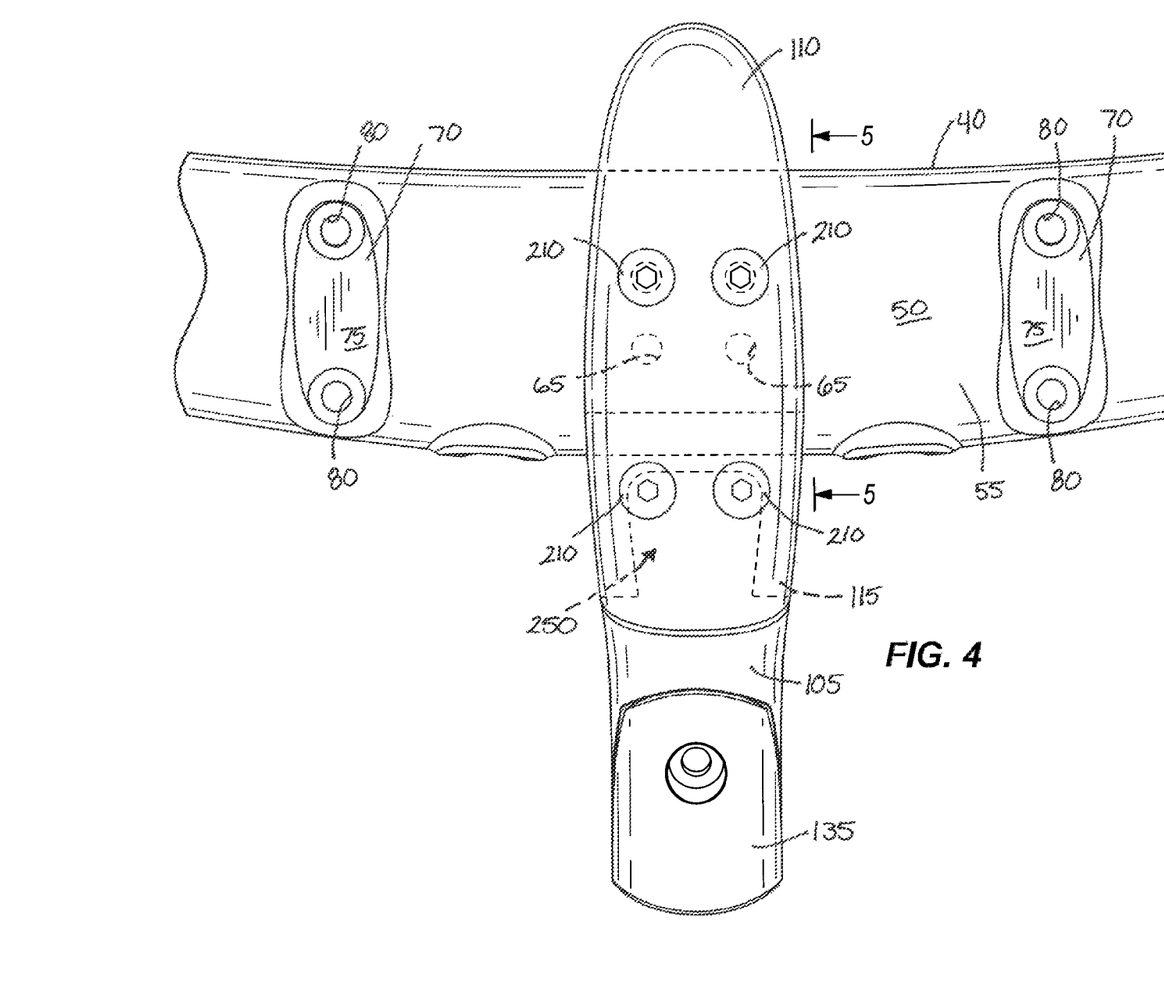
FIG. 4 is a top view of the front portion of the bicycle in FIG. 2.

The shim 115 also includes a first clamp surface 255 that is defined along the bridge 245 of the first shim portion 230, and a second clamp surface 260 that is defined along the bridge 245 of the second shim portion 235. As illustrated in FIGS. 4-6, the first and second clamp surfaces 255, 260 face each other, and the shim 115 is coupled to the handlebar 40 so that the first and second clamp surfaces 255, 260 are engaged with the curved outer surfaces 50 to hold the handlebar 40 in the opening 195 defined by the stem 105 and the clamp 110. Generally, the handlebar 40 and the shim 115 are placed on the curvilinear surface 150 that defines the first cavity 140, and the clamp 110 is placed over the handlebar 40 and the shim 115 to enclose the first cavity 140.

With reference to FIGS. 5 and 6, the length of the stem 105 between the steerer tube (head tube 30) and the handlebar 40 can be adjusted by repositioning the shim 115 relative to the handlebar 40 within the opening 195. For example, FIG. 5 shows that the handlebar 40 can be coupled to the stem 105 in a first position at a forward end of the stem assembly 45 adjacent the second end 125 of the stem 105. When the handlebar 40 is in the first position, the shim 115 is disposed in a first location within the opening 195 on one side of the handlebar 40. The clamp 110 is coupled to the stem 105 so that the first mating surfaces 145, 185 are in contact with each other and the second mating surfaces 147, 187 are in contact with each other so that the stem 105 and the clamp 110 cooperatively define an aerodynamic profile adjacent the forward end of the bicycle 10. The first mating surfaces 145, 185 cooperatively define a rear joint or interface between the stem 105 and the clamp 110, and the second mating surfaces 147, 187 cooperatively define a front joint or interface between the stem 105 and the clamp 110.

In the first location, the shim 115 has a first orientation in which the distal end 220 abuts the stem 105 and the clamp 110 adjacent the respective first ends 120, 165, and the clamp end 215 faces forward relative to the direction of travel of the bicycle 10 to engage the handlebar 40. The clamp 110 directly contacts the handlebar 40 and the shim 115 to hold the handlebar 40 in the first position. In other words, the handlebar 40 directly abuts the stem 105, the clamp 110, and the shim 115 in the first position. As illustrated in FIG. 5, the shim 115 spans the rear interface defined by the first mating surfaces 145, 185.

With reference to FIGS. 4-5, the forward-most laterally-spaced stem fasteners 210 extend through the corresponding second fastener holes 205 in the clamp 110 and the holes 65 in the handlebar 40 (the forward-most holes 65 as illustrated in FIGS. 3 and 4), and into the forward-most first fastener holes 155 in the stem 105. The rearward-most laterally spaced stem fasteners 210 extend through the corresponding second fastener holes 205 in the clamp 110, through the void 250, and into the rearward-most first fastener holes 155 in the stem 105. In this manner, the stem fasteners 210 extend between the clamp 110 and the stem 105 to rigidly secure the handlebar 40 and the shim 115 to the stem 105 without directly contacting the shim 115. With the clamp 110 secured to the stem 105, the first and second portions of the shim 115 are squeezed together so that the shim 115 provides a pinching or clamping force that retains the handlebar 40 in the first position.

FIG. 6 shows that the handlebar 40 can be coupled to the stem 105 in a second position at a middle area of the stem assembly 45 adjacent the first end 120 of the stem 105. As illustrated, the second position is spaced from the first position longitudinally along the stem 105. Thus, when the handlebar 40 is in the second position, the shim 115 is disposed in a second location within the opening 195 on the other side of the handlebar 40 such that the second location is spaced from the first location longitudinally along the stem 105. As described with regard to FIG. 5, the clamp 110 is coupled to the stem 105 so that the first mating surfaces 145, 185 are in contact with each other and the second mating surfaces 147, 187 are in contact with each other so that the stem 105 and the clamp 110 cooperatively define an aerodynamic profile adjacent the forward end of the bicycle 10.

In the second location, the shim 115 has a second orientation that is symmetrically opposite the first orientation. Stated another way, the second orientation of the shim 115 is a mirror image of the first orientation of the shim 115. Specifically, when the shim 115 is in the second location, the shim 115 is on a side of the handlebar 40 that is opposite the side of the handle bar 40 when the shim 115 is in the first location. In the second orientation, the distal end 220 abuts the stem 105 and the clamp 110 adjacent the respective second ends 125, 170, and the clamp end 215 faces rearward relative to the direction of travel of the bicycle 10 to engage the handlebar 40. The clamp 110 directly contacts the handlebar 40 and the shim 115 to hold the handlebar 40 in the second position. In other words, the handlebar 40 directly abuts the stem 105, the clamp 110, and the shim 115 in the first position. As illustrated in FIG. 6, the shim 115 spans the front interface defined by the second mating surfaces 147, 187.

With reference to FIG. 3, the forward-most laterally spaced stem fasteners 210 extend through the corresponding second fastener holes 205 in the clamp 110, through the void 250, and into the forward-most first fastener holes 155 in the stem 105. The rearward-most laterally spaced stem fasteners 210 extend through the corresponding second fastener holes 205 in the clamp 110, through the holes 65 in the handlebar 40 (the rearward-most holes 65 as illustrated in FIG. 3), and into the rearward-most first fastener holes 155 in the stem 105. In this manner, the stem fasteners 210 extend between the clamp 110 and the stem 105 to rigidly secure the handlebar 40 and the shim 115 to the stem 105 without directly contacting the shim 115. With the clamp 110 secured to the stem 105, the first and second portions of the shim 115 are squeezed together so that the shim 115 provides a pinching or clamping force that retains the handlebar 40 in the second position.

The handlebar 40 can be repositioned within the opening 195 between the stem 105 and the clamp 110 to achieve a desired length of the stem 105 by removing the stem fasteners 210 from the stem 105 and the clamp 110 so that the clamp 110 can be decoupled from the stem 105. The handlebar 40 can then be moved from one of the first position (FIG. 5) and the second position (FIG. 6) to the other of the first position and the second position. The shim 115 is moved from one of the first location and the second location based on the position in which the handlebar 40 is placed in the stem 105 so that the handlebar 40 can be rigidly secured to the stem assembly 45 in either the first position or the second position.

Various features and advantages of the invention are set forth in the following claims.

The invention claimed is:

1. A bicycle comprising:
a frame including a head tube;
a fork rotationally coupled to the head tube and including a steerer tube extending upward through the head tube;
a wheel rotationally coupled to the fork;
a handlebar; and
a stem assembly coupled to and extending from the steerer tube to couple the handlebar to the fork, the stem assembly including a stem, a shim coupled to the stem, and a clamp contacting both the shim and the handlebar to secure the handlebar to the stem assembly, wherein the shim is repositionable on opposite sides of the handlebar in a longitudinal direction.

2. The bicycle of claim 1, wherein the stem and the clamp cooperatively define an opening through which the handlebar extends, and wherein the shim is disposed in the opening.

3. The bicycle of claim 2, wherein the handlebar can be positioned relative to the stem assembly in one of a first position and a second position different from the first position, and wherein the shim has a first orientation when the handlebar is in the first position and a second orientation when the handlebar is in the second position, and wherein the second orientation is symmetrically opposite the first orientation.

4. The bicycle of claim 3, wherein the shim is disposed in a first location when the handlebar is in the first position and in a second location when the handlebar is in the second position, and wherein the second location is spaced from the first location longitudinally along the stem.

5. The bicycle of claim 3, wherein a fastener extends through the clamp, the handlebar, and into the stem to secure the handlebar in one of the first position and the second position.

6. The bicycle of claim 5, wherein the fastener extends between the clamp and the stem without contacting the shim.

7. A stem assembly for attaching a handlebar to a bicycle frame, the stem assembly comprising:
a stem;
a shim coupled to the stem; and
a clamp attached to the stem, the clamp in direct contact with the shim and directly contactable with the handlebar to hold the handlebar in one of a first position and a second position different from the first position, wherein the shim is repositionable on opposite sides of the handlebar in a longitudinal direction.

8. The bicycle of claim 7, wherein the stem and the clamp cooperatively define an opening through which the handlebar is extendible, and wherein the shim is disposed in the opening.

9. The bicycle of claim 8, wherein the shim has a first orientation when the handlebar is in the first position and a second orientation when the handlebar is in the second position, and wherein the second orientation is symmetrically opposite the first orientation.

10. The bicycle of claim 9, wherein the shim is disposed in a first location when the handlebar is in the first position and in a second location when the handlebar is in the second position, and wherein the second location is spaced from the first location longitudinally along the stem.

11. The bicycle of claim 7, wherein a fastener extends through the clamp, the handlebar, and into the stem to secure the handlebar in one of the first position and the second position.

12. The bicycle of claim 11, wherein the fastener extends between the clamp and the stem without contacting the shim.

13. A bicycle comprising:
a frame including a head tube;
a fork rotationally coupled to the head tube and including a steerer tube extending upward through the head tube;
a wheel rotationally coupled to the fork;
a handlebar; and
a stem assembly coupled to and extending from the steerer tube to attach the handlebar to the fork, the stem assembly including a stem, a shim coupled to the stem, and a clamp attached to the stem to hold the handlebar in one of a first position and a second position different from the first position, the handlebar abutting the stem, the clamp, and the shim in the first position, and
wherein the shim is repositionable to different locations in the stem to adjust the effective length of the stem, wherein the shim is repositionable on opposite sides of the handlebar in a longitudinal direction.

14. The bicycle of claim 13, wherein the handlebar further abuts the stem, the clamp, and the shim in the second position.

15. The bicycle of claim 13, wherein the stem and the clamp cooperatively define an opening through which the handlebar extends, and wherein the shim is disposed in the opening.

16. The bicycle of claim 13, wherein the shim has a first orientation when the handlebar is in the first position and a second orientation symmetrically opposite the first orientation when the handlebar is in the second position, and wherein repositioning the shim between the first and second orientations changes the distance between the handlebar and the steerer tube.

17. The bicycle of claim 16, wherein the shim is disposed in a first location when the handlebar is in the first position and in a second location when the handlebar is in the second position, and wherein the second location is spaced from the first location longitudinally along the stem.

18. The bicycle of claim 13, wherein a fastener extends through the clamp, the handlebar, and into the stem to secure the handlebar in one of the first position and the second position.

19. The bicycle of claim 18, wherein the fastener extends between the clamp and the stem without contacting the shim.

20. The bicycle of claim 13, wherein the stem defines a cavity and the handlebar and the shim are disposed in the cavity, and wherein the clamp encloses the cavity to secure the handlebar and the shim to the stem.

\* \* \* \* \*